Oct. 31, 1961 HIDEO KATSUHARA 3,006,662

FLEXIBLE CONNECTING TUBE FOR CONVEYANCE

Filed March 21, 1958

Inventor
Hideo Katsuhara
By Alvin Browdy
Attorney 3,006,662
FLEXIBLE CONNECTING TUBE FOR
CONVEYANCE
Hideo Katsuhara, Tokyo, Japan, assignor to Onoda
Cement Company Limited, Onoda City, Japan
Filed Mar. 21, 1958, Ser. No. 723,006
2 Claims. (Cl. 285—114)

This invention relates to a flexible tube made of such water-proof material as water-proofed canvas, leather or cloth or vinyl or polyethylene resin, provided with a reinforcing cloth piece and with or without a stretching bone in each flexibly bending part and with reinforcing ropes in the longitudinal direction on the outer periphery of the flexible tube and fixed to the respective adjacent pipes at its upper and lower ends, the lower pipe being provided with a guide for the flexible tube and the upper and lower parts of the flexible tube being made free to be connected to any proper pipes or troughs for conveyance.

Figure 5:
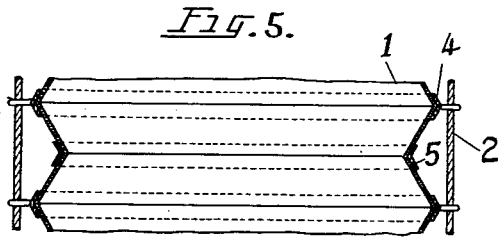

According to the present invention, a flexible tube 1 is formed of such water-proof material as water-proofed canvas or cloth or vinyl or polyethylene resin and reinforcing cloth pieces 4 and 5 are stitched or pasted to the respective flexibly bending parts. A stretching bone 3 is fixed to the corner part on the inside or outside of the flexible tube 1 by a proper means. In some cases, as shown in FIGURE 5, such stretching bone may be omitted. Fitting rings 6 are fixed to the stretching bone 3 or the reinforcing cloth piece 4. Several reinforcing ropes 2 are properly fixed to or inserted through said rings 6 in the longitudinal direction around the flexible tube 1 so as to prevent damage against any movement.

Fixed to the opposite ends of the flexible tube 1 are connectors 9 and 10, respectively, which comprise a tubular portion 11 and 12, respectively having a diameter conforming to a respective adjacent end of the tube 1. Tubular portions 11 and 12 terminate in peripheral flanges 13 and 14, respectively, see FIGS. 1 and 2. The portions 11 and 12 are sealed to the ends of the tube 1 by suitable circumferential sealing bands 8. The flanges 13 and 14 will include transverse apertures (not shown) and receive thereon similar apertured flange portions 13' and 14', respectively, of conventional connectors fixed to the ends of tubular conduits 15 and 16, respectively. Suitable fasteners shown diagrammatically at 17, such as nut-and-bolt assemblies (not shown), will extend transversely through the flanges 13, 13' and 14, 14'.

Figure 1:
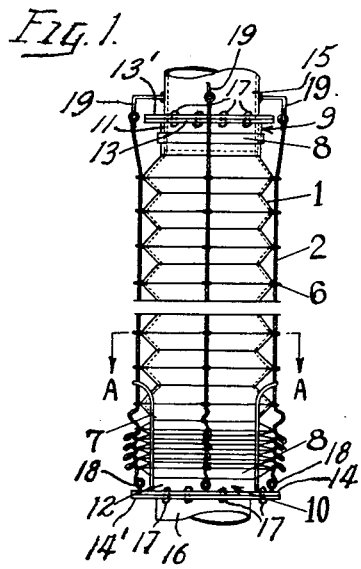
FIGURE 1 is a side view of the present invention.
Figure 4:
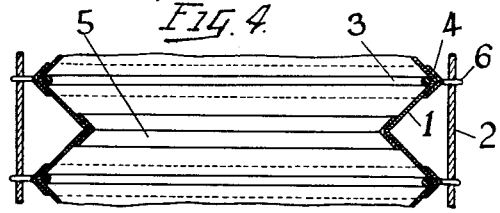
FIGURES 4, 5, 6, 7 and 8 are sectional view of parts of different types of the flexible tube of the present invention.
Figure 3:
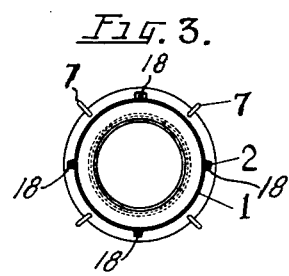
FIGURE 3 is a cross-sectioned plan view on line A—A in FIGURE 1.
Figure 6:
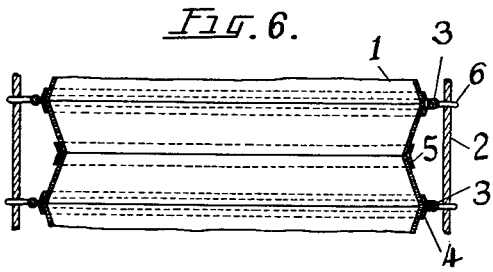
Figure 7:
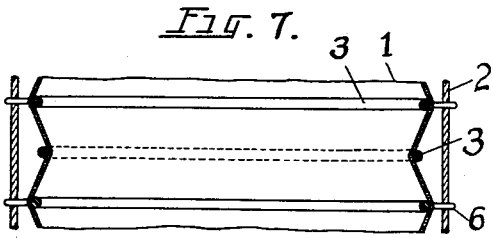
Figure 2:
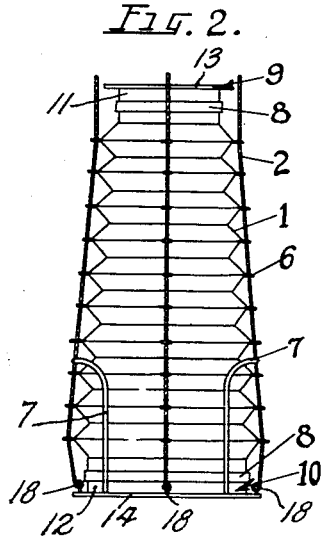
FIGURE 2 is a side view of a partial modification of the present invention.
Figure 8:
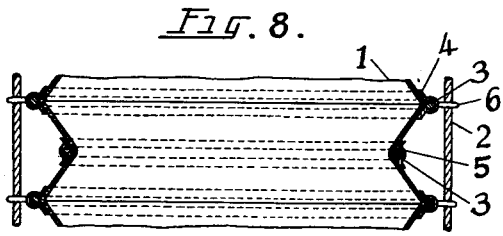

The flange 14 has fixed thereto, see FIGS. 1–3, connector portions 18 to which one end of the flexible ropes 2 are suitably secured. The other ends of the flexible ropes 2 are suitably secured to the conduit 15 as indicated digrammatically at 19. Also fixed to the flange 14 and projecting along the sides of the tube 1 are elongated guide rods 7 which curve outwardly at their upper ends, and which extend longitudinally in spaced relation from the tube 1. The rods 7 combine to form a skeletonized cage to receive the collapsed tube 1; see FIG. 1, for example.

As the present invention is constructed as described above, any one of the flexible tubes 1 shown in FIGURES 4 to 8 may be adopted in use. When one end of said flexible tube 1 is connected to the outlet of a conveying pipe or trough 15 installed in a ship and the other end of said tube is connected to the inlet of a conveying pipe or trough 16 outside the ship, for example, for conveyance to the land or any required place, grains or powder loaded in bulk in the ship can be smoothly unloaded onto the land or into any required place through the conveying pipes or troughs in the ship, the flexible tube 1 and the other conveying pipes outside the ship by such means as a screw conveyer. In such case, the flexible tube 1 will be free to extend, contract, bend and incline in accordance with the rocking or displacement in any direction of the ship with respect to the land or the required place as caused by waves, variation of the draught, wind, rain or other weather conditions. Thus, the grains or powder can be safely and continuously conveyed from the upper conveying pipe or the like to the conveying pipe connected to the lower part of the flexible tube and arranged on the land or in the required place. In the extension and contraction, the flexible tube 1 can extend out of a guide 7 in any angle. The tubular body can be always kept down accurately by the overlapping stretching bones 3. The ends of each reinforcing rope 2 are so made as to be able to engage with the upper and lower conveying tubes, respectively. Therefore, there is no fear of the flexible tube 1 accidentally dropping off. Thus the present invention has an advantage that grains or powder loaded in a ship can be thereby safely unloaded onto the land or into any required place in spite of any rocking of the ship in any stormy weather.

I claim:

1. A flexible connector for use with a pair of conduits for conveying a fluent material from a relatively unstable location to a relatively fixed location, said flexible connector comprising an elongated, flexible tubular body including connecting means at opposite ends for connection between said conduits, said body comprising a plurality of longitudinally spaced, circumferential pleats extending around said body for permitting extension, contraction and lateral movement between said conduits in a range of 360°, longitudinally spaced and aligned guide means extending in circumferentially spaced relation, laterally from said body, flexible reinforcing elements extending longitudinally and loosely through said guide means, said reinforcing elements being secured at one end to one of said connecting means at one end of said body, the other end of said flexible reinforcing means extending beyond the connecting means at the other end of said body for securement to one of the pair of conduits secured thereat to said body, said flexible reinforcing means being foldable and extendable with said body and limiting maximum longitudinal extension of the same, and guides fixed to the connecting means to which said one end of the flexible reinforcing means is secured and extending longitudinally in spaced relation along said body for receiving said flexible tubular body when it is collapsed.

2. The structure of claim 1; said body including circumferential reinforcing means extending about said circumferential pleats.

References Cited in the file of this patent
UNITED STATES PATENTS

| | | |
|---|---|---|
| 1,802,414 | Evans | Apr. 28, 1931 |
| 2,410,632 | Colley et al. | Nov. 5, 1946 |
| 2,493,404 | Haynes | Jan. 3, 1950 |
| 2,673,100 | Shumaker | Mar. 23, 1954 |
| 2,804,095 | Schauenburg | Aug. 27, 1957 |
| 2,836,200 | Webbe | May 27, 1958 |